United States Patent
Motofuji et al.

(10) Patent No.: US 9,452,553 B2
(45) Date of Patent: Sep. 27, 2016

(54) SURFACE STRUCTURE OF ARTICLE

(75) Inventors: Akane Motofuji, Sagamihara (JP); Makoto Tamuraya, Isehara (JP); Takashi Takeuchi, Atsugi (JP); Hideo Fujimoto, Nagoya (JP); Akihito Sano, Nagoya (JP); Hiromi Mochiyama, Nagoya (JP); Naoyuki Takesue, Nagoya (JP); Yoshihiro Tanaka, Nagoya (JP)

(73) Assignees: NISSAN MOTOR CO., LTD., Yokohama-Shi (JP); NATIONAL UNIVERSITY CORPORATION NAGOYA INSTITUTE OF TECHNOLOGY, Nagoya-Shi (JP)

( * ) Notice: Subject to any disclaimer, the term of this patent is extended or adjusted under 35 U.S.C. 154(b) by 989 days.

(21) Appl. No.: 13/502,602

(22) PCT Filed: Oct. 13, 2010

(86) PCT No.: PCT/JP2010/067945
§ 371 (c)(1),
(2), (4) Date: Apr. 18, 2012

(87) PCT Pub. No.: WO2011/048988
PCT Pub. Date: Apr. 28, 2011

(65) Prior Publication Data
US 2012/0202009 A1    Aug. 9, 2012

(30) Foreign Application Priority Data
Oct. 20, 2009    (JP) .................................. 2009-241219
Jul. 16, 2010    (JP) .................................. 2010-161867

(51) Int. Cl.
*B32B 3/30*       (2006.01)
*B29C 33/38*     (2006.01)
(Continued)

(52) U.S. Cl.
CPC .......... *B29C 33/3857* (2013.01); *B29C 33/424* (2013.01); *B29C 41/18* (2013.01); *B29C 2059/023* (2013.01); *B29K 2995/0094* (2013.01);
(Continued)

(58) Field of Classification Search
CPC ............ B29C 33/3857; B29C 33/424; Y10T 428/24479; B29L 2031/3005
See application file for complete search history.

(56) References Cited

U.S. PATENT DOCUMENTS 5,316,825 A * 5/1994 Nakai et al. ................... 428/156
7,070,850 B2 * 7/2006 Dietz et al. ................... 428/172
(Continued)

FOREIGN PATENT DOCUMENTS

CN    101161221 A    4/2008
CN    101474896 A    7/2009
(Continued)

OTHER PUBLICATIONS

Chinese Office Action dated Dec. 2, 2013, (6 pgs.).
(Continued)

*Primary Examiner* — Donald J Loney
(74) *Attorney, Agent, or Firm* — Foley & Lardner LLP

(57) ABSTRACT

Disclosed is a surface structure of an article (1) including multiple protrusions (3) on the surface. A height H of the protrusions (3) is equal to or larger than 5 μm, and equal to or smaller than 32 μm, as well as at least one of a distance P between each two neighboring protrusions (3) and a distance W between each neighboring two of recesses (5) formed between the protrusions (3) is larger than the height H of the protrusions (3).

6 Claims, 7 Drawing Sheets

(51) Int. Cl.
  *B29C 33/42*   (2006.01)
  *B29C 41/18*   (2006.01)
  B29L 31/30     (2006.01)
  B29C 59/02     (2006.01)

(52) U.S. Cl.
  CPC . *B29L 2031/3005* (2013.01); *Y10T 428/24479* (2015.01)

(56) References Cited

U.S. PATENT DOCUMENTS

| | | |
|---|---|---|
| 7,608,316 B2 | 10/2009 | Okajima et al. |
| 2004/0001931 A1* | 1/2004 | Izzi et al. ............... 428/40.1 |
| 2005/0162747 A1* | 7/2005 | Shimizu .......... B29D 11/00278 359/619 |
| 2007/0020437 A1 | 1/2007 | Yamauchi et al. |
| 2007/0213463 A1 | 9/2007 | Sherman et al. |
| 2008/0090050 A1 | 4/2008 | Seyler et al. |
| 2008/0160226 A1* | 7/2008 | Kaule ............... D21H 21/44 428/29 |
| 2010/0028604 A1 | 2/2010 | Bhushan et al. |
| 2010/0276844 A1 | 11/2010 | Han et al. |

FOREIGN PATENT DOCUMENTS

| | | |
|---|---|---|
| EP | 2 724 833 A1 | 4/2014 |
| JP | 7-144363 A | 6/1995 |
| JP | 8-1770 A | 1/1996 |
| JP | 8-72065 A | 3/1996 |
| JP | 8-72140 A | 3/1996 |
| JP | 3654936 B2 | 6/2005 |
| JP | 2005-263197 A | 9/2005 |
| JP | 2006-68972 A | 3/2006 |
| JP | 2007-22000 A | 2/2007 |
| KR | 2009-0094778 A | 9/2009 |

OTHER PUBLICATIONS

Supplementary European Search Report dated Dec. 2, 2014, 6 pgs.
Japanese Office Action with English language translation dated Sep. 30, 2014, 3 pgs.

\* cited by examiner

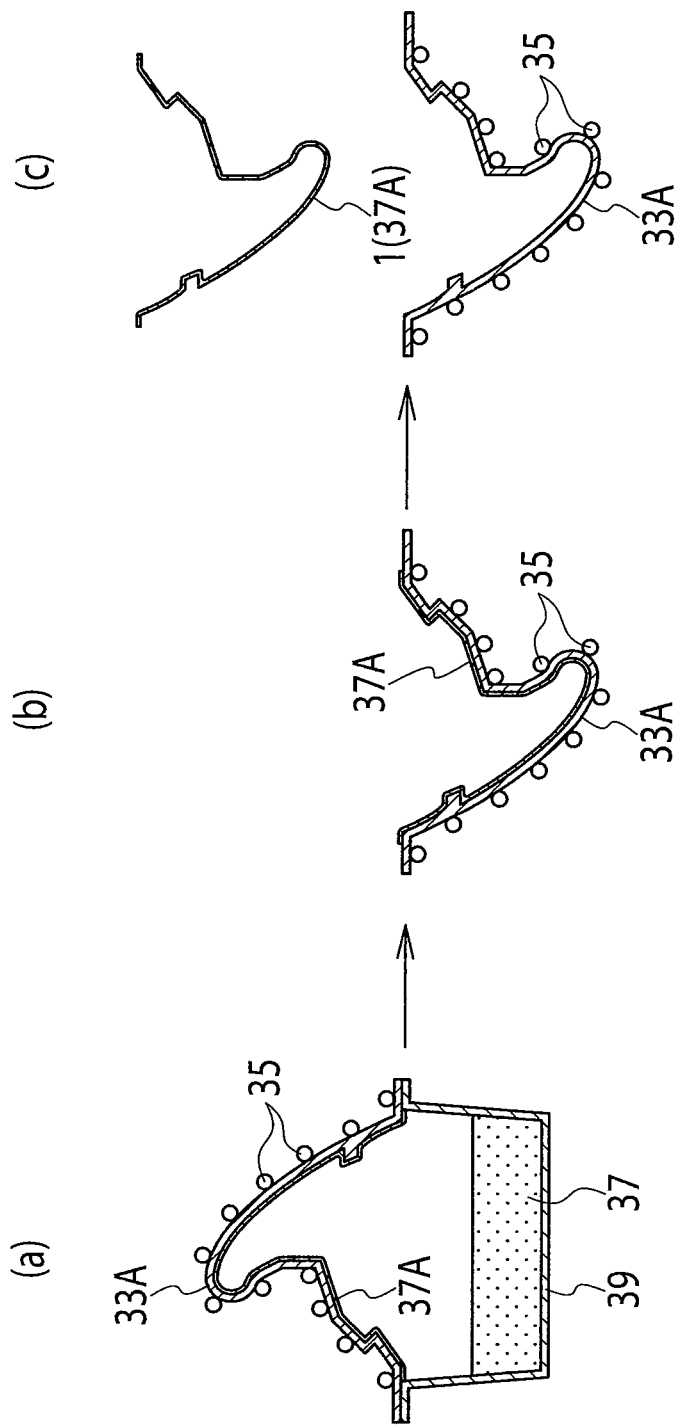

SURFACE STRUCTURE OF ARTICLE

TECHNICAL FIELD

The present invention relates to a surface structure of an article including fine protrusions on a surface of the article.

BACKGROUND ART

Japanese Patent Application Publication No. 2005-263197 discloses a technique of giving a product an aesthetic appearance and texture as if the product is made from woven textiles or leather by providing a surface of the product with a decoration layer which includes an uneven pattern and multiple linear grooves having a depth larger than a depth of the uneven pattern.

SUMMARY OF INVENTION

Technical Problem

For example, an image of an article such as an interior trim part of an automobile can be enhanced by making its surface, i.e., a portion to be in contact with the human skin, have a moist texture.

An object of the present invention is to provide a surface structure of an article which enables a surface of the article to have a moist texture.

Solution to Problem

An aspect of the present invention is a surface structure of an article including multiple protrusions on the surface. A height H of the protrusions is equal to or larger than 5 µm, and equal to or smaller than 32 µm. At least one of a distance P between each two neighboring protrusions and a distance W between each neighboring two of recesses formed between the protrusions is larger than the height H of the protrusions.

BRIEF DESCRIPTION OF DRAWINGS

FIG. 9 is a diagram showing manufacturing steps for the interior trim part continuing from FIG. 8, in which: (a) shows a state where the resin melts and forms a skin on the surface of the electroforming mold through the operation in FIG. 8(c); (b) shows a state where the powder box is detached from the electroforming mold in (a); and (c) shows a state where as the interior trim part, the skin is taken out of the electroforming mold in (b).

DESCRIPTION OF EMBODIMENTS

A surface structure of an article according to an embodiment of the present invention is described in detail below based on the drawings.

Figure 1:
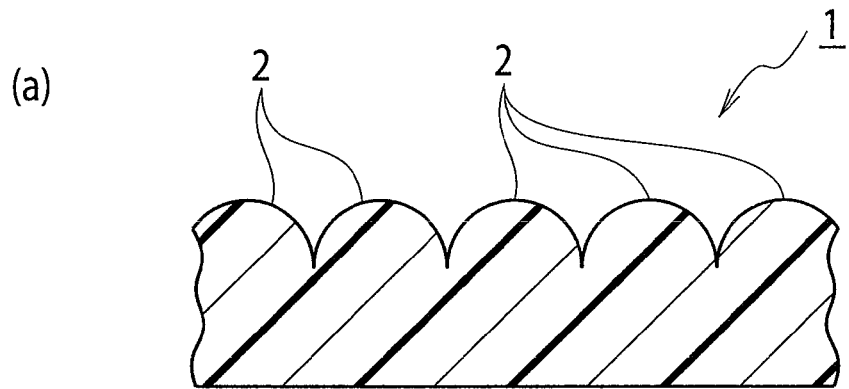
FIG. 1 is a cross-sectional view of an interior trim part according to an embodiment of the present invention, in which: (a) is an enlarged cross-sectional view showing a surface of a part of the interior trim part; and (b) is an enlarged cross-sectional view showing a convex surface formed in the surface of the interior trim part in (a).

For example, an interior trim part 1 as the article shown in FIG. 1 is used for a surface of a console box, an interior surface of a door, or a surface of an instrumental panel in an automobile as a vehicle. A material of the interior trim part 1 is resins such as polyvinyl chloride (PVC), thermoplastic polyurethane (TPU), and thermoplastic olefin (TPO).

As shown in FIG. 1(a), multiple convex surfaces 2 are formed in a surface of the interior trim part 1. As shown in FIG. 1(b), multiple extremely fine protrusions 3 are formed evenly on a surface of each convex surface 2. The protrusions 3 satisfy the following conditions (1) and (2).

(1) The height H of the protrusions 3 is equal to or larger than 5 µm, and equal to or smaller than 32 µm.

(2) At least one of a distance P between each two neighboring protrusions 3 and a distance W between each neighboring two of recesses 5 formed between the protrusions 3 is larger than the height H of the protrusions 3.

In this respect, each protrusion 3 is shaped like a hemisphere which is almost a half of a sphere. The height H of the protrusion 3 is a height from the surface of the convex surface 2 to a tip (apex) of the protrusion 3, or a height from a bottom surface of each of the recesses 5 formed between the protrusions 3 (a bottom portion of each of grooves formed between the protrusions 3) to the tip of the protrusion 3 in the cross section shown FIG. 1(b). The distance P between each two neighboring protrusions 3 is a distance between any neighboring two of the protrusions 3 on the surface of the convex surface 2, or an average value of the distances. The distance W between each neighboring two of the recesses 5 is a distance between any neighboring two of the recesses 5 on the surface of the convex surface 2, or an average value of the distances.

Depending on the necessity, the distance between each two neighboring convex surfaces 2 and the distance between each neighboring two of the grooves formed between the convex surfaces 2 on the surface of the interior trim part 1 may be selected in accordance with a design to be given to the surface of the interior trim part 1. Although no specific restriction is imposed on the shape of the interior trim part 1, the shape of each convex surface 2 may be set in a way that: for example, in the cross-sectional view of FIG. 1(*b*), the tip (apex) of the convex surface 2 has a curvature radius larger than the height H of the protrusion 3, and as an example, the curvature radius is about 2 to 10 times as large as the height H of the protrusion 3. Furthermore, protrusions 3 may be formed in a flat surface or a concave surface.

Because the protrusions 3 satisfying the conditions (1) and (2) are formed on the surface of the interior trim part 1, the embodiment makes it easier for the tips of the protrusions 3 to come into contact with the bottoms of the grooves between the friction ridges of a finger when a person touches the surface of the interior trim part 1 with his or her fingertip or palm. Accordingly, the embodiment makes is possible to obtain a moist tactile feel (hereinafter referred to as "moist texture") which is neither a slippery tactile feel like that of plastic or metal nor a rough tactile feel like that of a grain pattern, but which is a tactile feel with a moderate frictional feel as if the surface has some moisture.

Furthermore, the embodiment makes it easier for the tips of the protrusion to come into contact with the bottoms of the grooves between the friction ridges of a finger when the person touches the surface thereof with his or her fingertip or palm, because the distance P between each two neighboring protrusions 3 is larger than the height H of the protrusions 3. Accordingly, the embodiment makes it possible to obtain the "moist texture" more securely.

Moreover, the embodiment makes it easier for the tips of the protrusion to come into contact with the bottoms of the grooves between the friction ridges of a finger when the person touches the surface thereof with his or her fingertip or palm, because the distance W between each neighboring two of the recesses 5 formed between the protrusions 3 is larger than the height H of the protrusions 3. Accordingly, the embodiment makes it possible to obtain the "moist texture" more securely.

The embodiment makes it much easier to obtain the "moist texture" because: as shown in FIG. 1(*b*), the multiple convex surfaces 2 are formed in the surface of the interior trim part 1; and the multiple extremely fine protrusions 3 are evenly formed on each convex surface 2. In addition, when the person touches the surface of the interior trim part 1 with his or her fingertip or palm, the surface tends to feel softer in a case where the multiple convex surfaces 2 are formed on the surface of the interior trim part 1 than in a case where the surface of the interior trim part 1 is a flat surface or a concave surface. Accordingly, the present embodiment makes it possible to obtain a stronger "moist texture."

Figure 2:
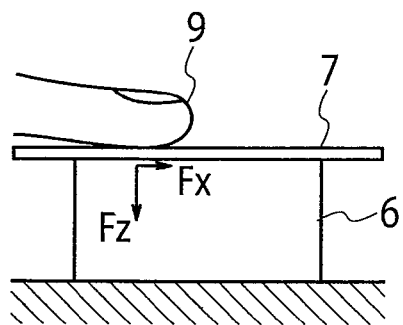
FIG. 2 is an explanatory diagram of an experiment performed to measure data on a correlation between a height of a protrusion provided on the surface of the interior trim part in FIG. 1(b) and a frictional coefficient.
Figure 3:
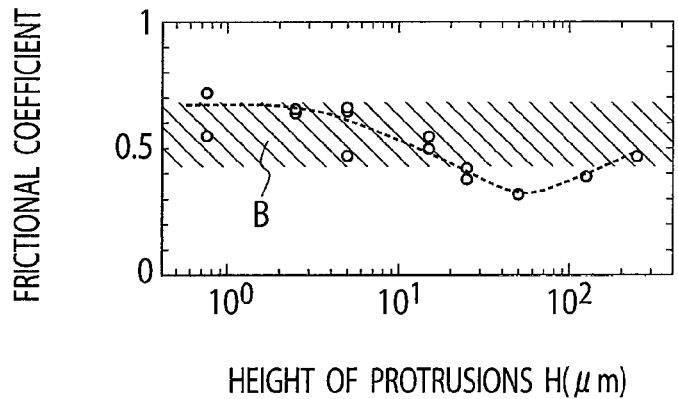
FIG. 3 is a diagram showing the correlation between the height of the protrusion provided on the surface of the interior trim part in FIG. 1(b) and the frictional coefficient.

It is generally said that a frictional coefficient $\mu$ of a surface having the "moist texture" is about 0.55±0.1. Multiple samples 7, among which the height H of the protrusions 3 was different, were prepared. Each sample 7 is placed on a force sensor 6, and the frictional coefficient $\mu$ obtained when a person rubbed the surface of the sample 7 with his or her finger was measured, as shown in FIG. 2. FIG. 3 shows the measurement result.

As shown in FIG. 3, when the height H of the protrusions 3 was H=5 μm to 32 μm, the frictional coefficient $\mu$ fell within the range of $\mu$=0.55±0.15 (a hatched portion B in FIG. 3). Thus, it was confirmed that the surface on which the multiple protrusions 3 satisfying the above-mentioned conditions were provided had the "moist texture."

Figure 4:
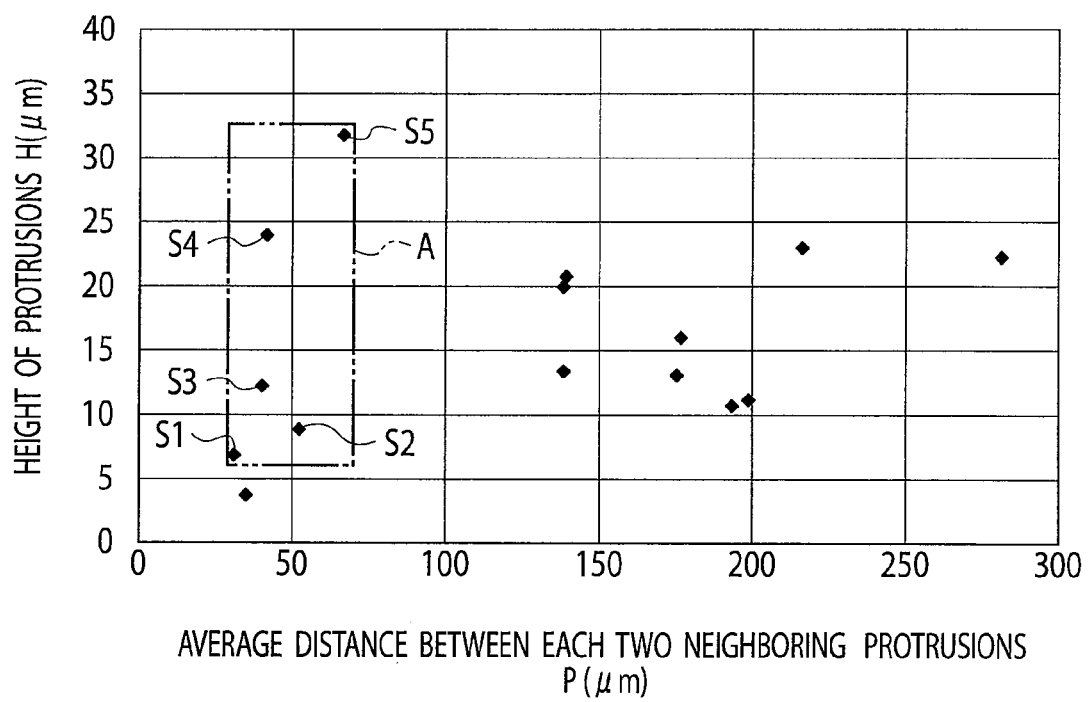
FIG. 4 is an explanatory diagram showing relationships among the height of the protrusions, the distance between the protrusions, and results sensory evaluation of "moist texture."

As a sensory evaluation test, multiple samples, among which the height H of the protrusions 3 and the distance P between each two neighboring protrusions 3 were different, were prepared. For each sample, multiple graders graded the "moist texture," which was felt when touching the surface of the sample with his or her palm, in a scale of one to five. FIG. 4 shows the results of the grading.

In FIG. 4, five samples S1 to S5 in a rectangular region A, which is elongated in a vertical direction and defined by a chain double-dash line, are samples evaluated as having an average grade of not less than 3.3 and having the "moist texture."

Of the samples S1 to S5, the sample S1 at a lower left portion of the region A had a protrusion height of H=6 μm and an inter protrusion distance of P=30 μm. Thus, the sample S1 had a ratio of H/P=1/5. The sample S5 at an upper right portion of the region A had a protrusion height of H=32 μm and an inter protrusion distance of P=64 μm. Thus, the sample S2 had a ratio of H/P=1/2.

From this result, too, it was able to be confirmed that the surface on which the multiple protrusions 3 satisfying the above-mentioned conditions were provided had the "moist texture."

From this result, it was further learned that the "moist texture" was able to be more surely obtained when the ratio H/P between the height H of the protrusions 3 and the distance P between each two neighboring protrusions 3 was in a range of H/P=1/5 to 1/2, or when the ratio H/W between the height H of the protrusions 3 and the distance W between each two neighboring recesses 5 was in a range of H/W=1/5 to 1/2.

In other words, the "moist texture" can be more surely obtained from the interior trim part 1 of the present embodiment by providing the surface of the interior trim part 1 of the embodiment with the protrusions 3 satisfying the following conditions (3) and (4) in addition to the above-mentioned conditions (1) and (2).

(3) The ratio H/P between the height H of the protrusions 3 and the distance P between each two neighboring protrusions 3 is in the range of 1/5 to 1/2, or the ratio H/W between the height H of the protrusions 3 and the distance W between each two neighboring recesses 5 is in the range of 1/5 to 1/2.

(4) The distance P between each two neighboring protrusions 3 and the distance W between each two neighboring recesses 5 are equal to each other (P=W).

Figure 5:
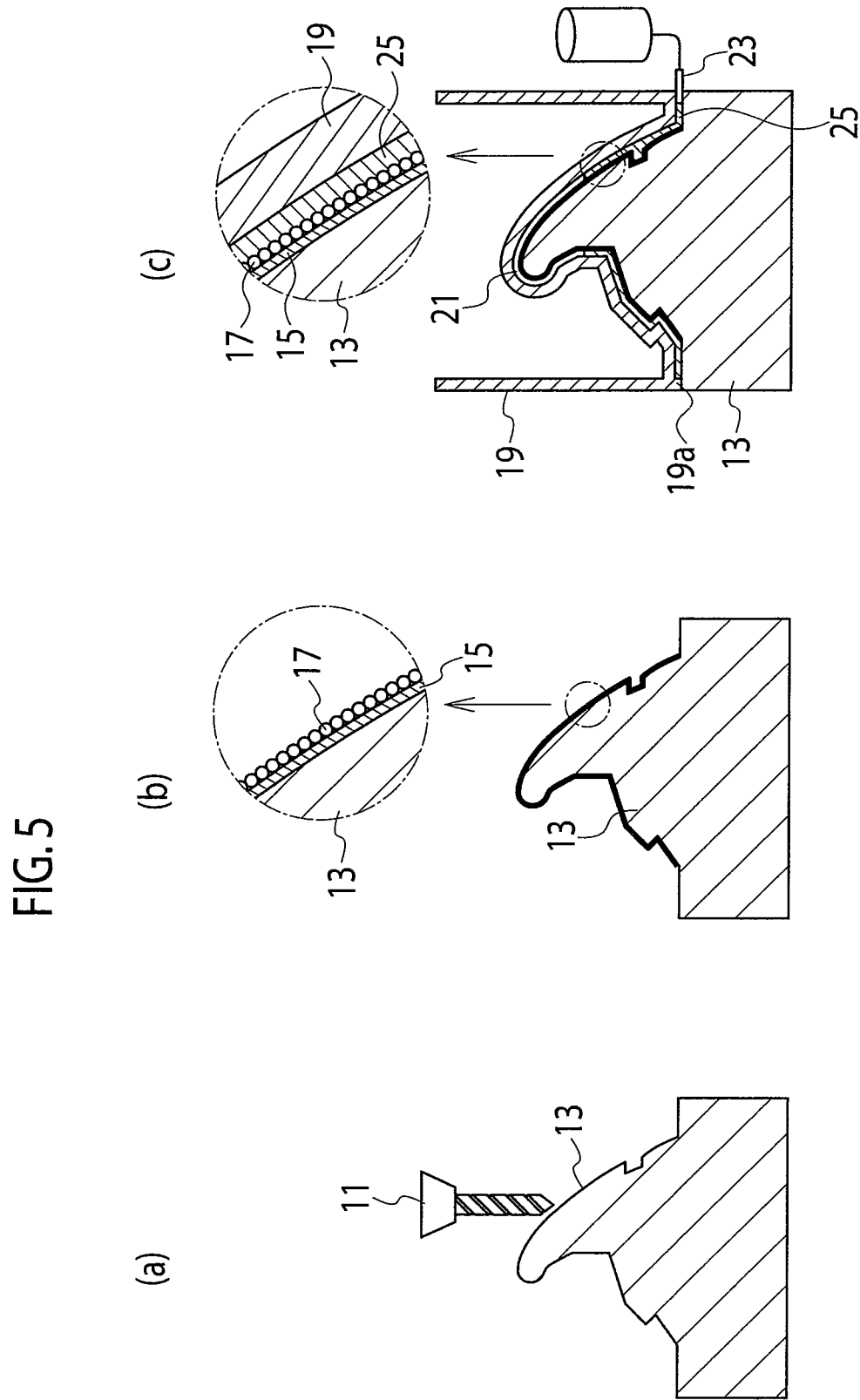
FIG. 5 is a diagram showing production steps for a mold for molding the interior trim part, in which: (a) shows a state where a wooden mold having a surface shape which is the same as a surface shape of the interior trim part is produced; (b) shows a state where a skin including fine particles is attached on a surface of the wooden mold; and (c) shows a state where silicone is filled in a gap between the wooden mold in (b) and a recessed mold.
Figure 6:
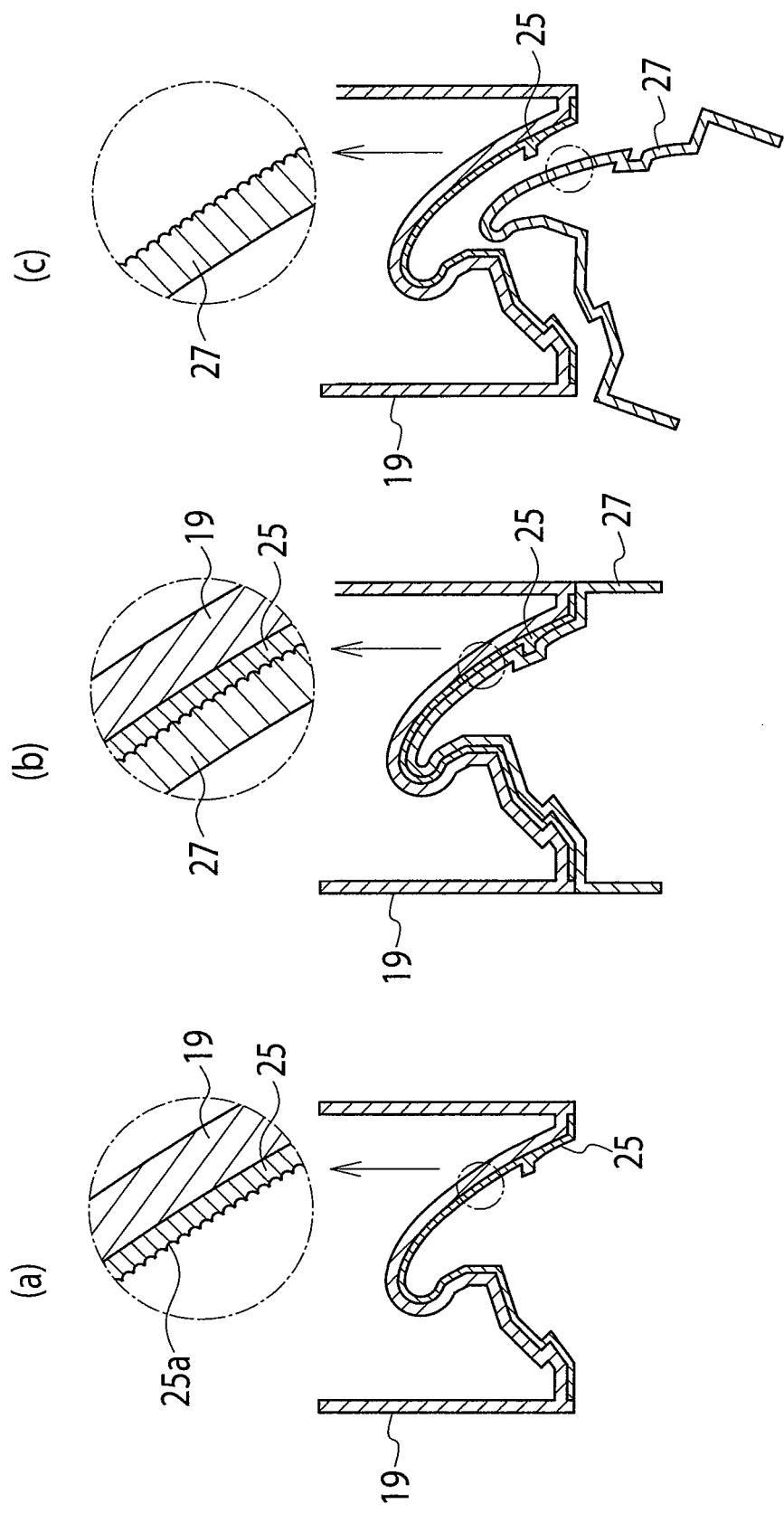
FIG. 6 is a diagram showing production steps continuing from FIG. 5, in which: (a) shows a state where the wooden mold is separated from the recessed mold after the filled silicone in FIG. 5(c) is cured; (b) shows a state where a base mold is produced by pouring a conductive material on a surface of the recessed mold in (a); and (c) shows a state where the base mold produced in (b) is removed.
Figure 7:
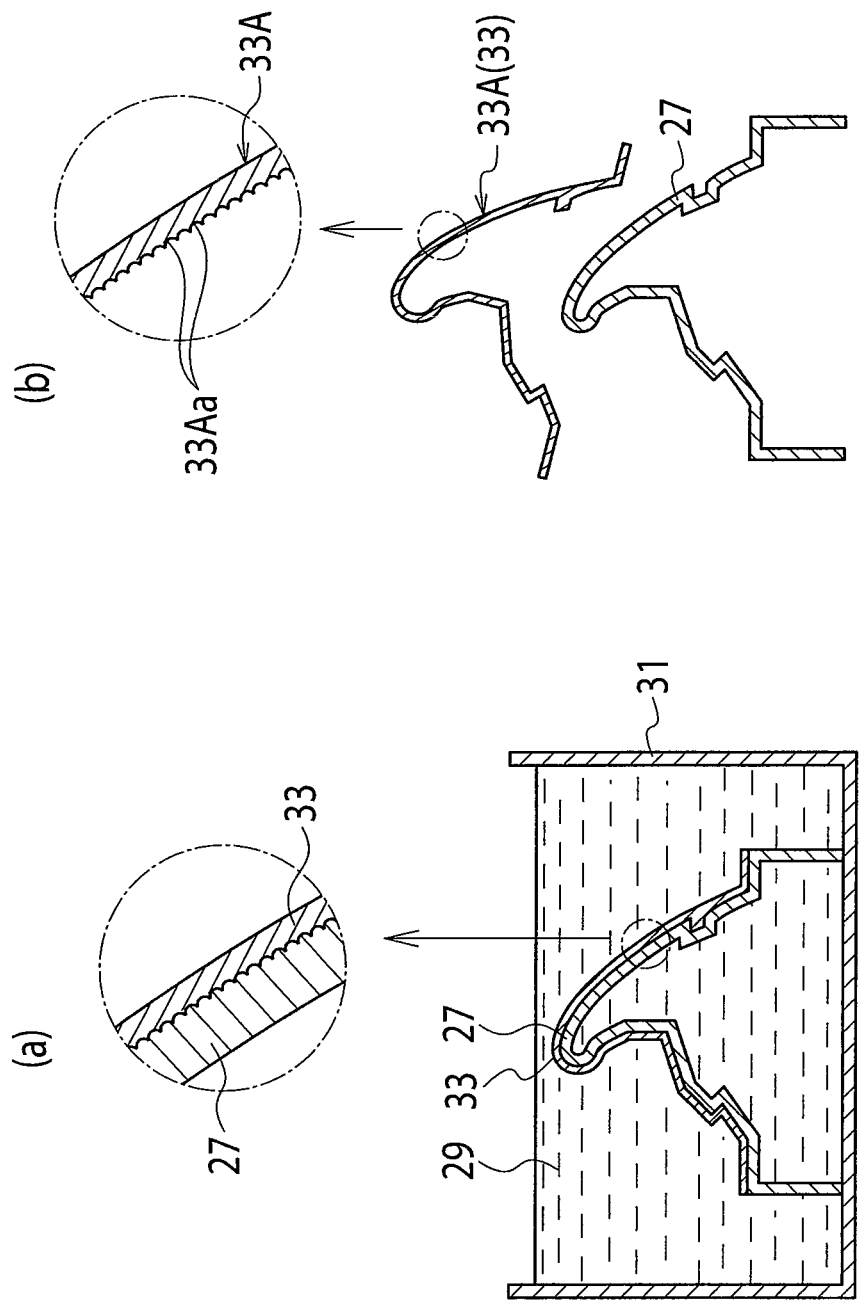
FIG. 7 is a diagram showing production steps continuing from FIG. 6, in which: (a) shows a state where a nickel layer is stacked on a surface of the base mold removed in FIG. 6(c) in an electroforming tank; and (b) shows a state where as an electroforming mold, the nickel layer stacked in (a) is separated from the base mold.

Next, production steps for a mold used for molding the interior trim part 1 is described based on FIGS. 5 to 7. As shown in FIG. 5(*a*), first, a wooden mold 13 is produced, whose surface shape is the same as the surface shape of the interior trim part 1, by NC processing using a processing tool 11. Then, as shown in FIG. 5(*b*), a skin 15 made of PVC or leather is attached on the surface of the thus produced wooden mold 13.

Particles 17 of polypropylene (PP), acryl or the like with an average particle diameter of about 30 μm are beforehand adhered to the surface of the skin 15 by using an adhesive. The particles 17 are adhered on the skin 15 as follows. A large amount of particles 17 are sprinkled on the skin 15 to which the adhesive is applied, and an excessive portion of the particles 17 layered on the adhesive is removed by being swept off using a brush. Thus, a required minimum amount of particles 17 can be substantially evenly and uniformly distributed on and adhered to the surface of the skin 15.

Thereafter, a recessed mold 19 shown in FIG. 5(*c*) that substantially matches the surface shape of the wooden mold 13 is prepared. A protrusion 19a is formed on an outer peripheral end portion of the recessed mold 19. The mold 19 is laid on the wooden mold 13 with the protrusion 19a in contact with an outer peripheral portion of the wooden mold 13. Thus, a gap 21 is formed between the molds 19 and 13. Silicone 25 in liquid state is discharged from a silicone discharge nozzle 23, and is filled into the gap 21. Thus, the surface shape of the wooden mold 13 (specifically, the surface shape of the skin 15 and the particles 17 arranged on the surface thereof) is copied with the silicone 25 (reverse product shape).

Figure 8:
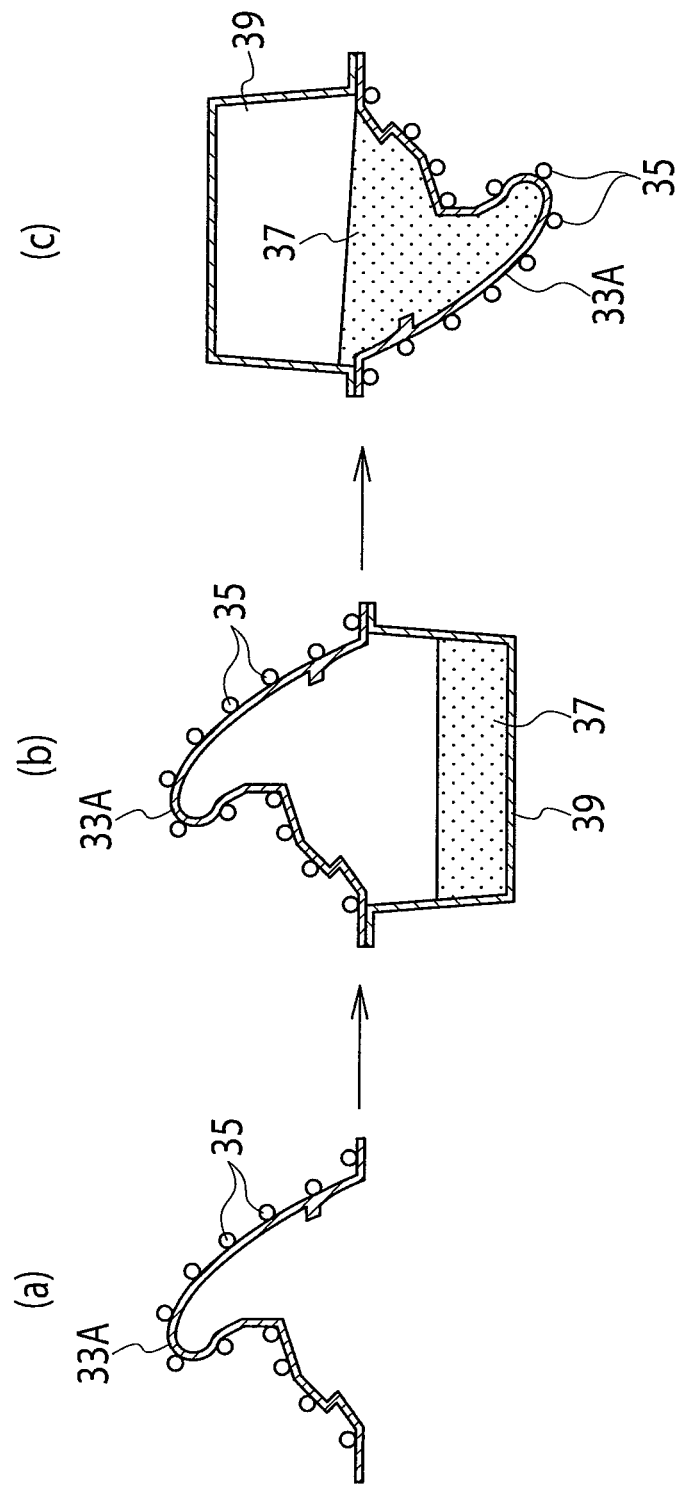
FIG. 8 is a diagram showing manufacturing steps for manufacturing the interior trim part by use of the electroforming mold produced in FIG. 5 to FIG. 7, in which: (a) shows a state where pipes are set on a surface of the electroforming mold; (b) shows a state where a powder box storing resin is set on a lower portion of the electroforming mold in (a); and (c) shows a state where the electroforming mold is turned together with the powder box in (b).

For example, the recessed mold 19 can be produced by powder slush molding in FIG. 8 and FIG. 9, which will be described later.

When the silicone 25 finished being filled in the gap 21 and is cured, the wooden mold 13 including, on the surface, the particles 17 shown in FIG. 5(c) is released from the recessed mold 19, as shown in FIG. 6(a). In this event, the silicone 25 is attached to the mold 19 whose frictional coefficient is larger than the particles 17 on the wooden mold 13. The reversed shape of the product shape is transcribed to a surface of the silicone 25 attached on the surface of the mold 19, and multiple fine recesses 25a respectively corresponding to the particles 17 shown in FIG. 5(b) are evenly formed on it.

Then, a conductive material (anything that allows nickel vapor deposition) is poured onto the surface of the silicone 25 to produce a base mold 27, as shown in FIG. 6(b). Thereafter, the base mold 27 thus produced is detached, as shown in FIG. 6(c). The detaching can be easily detached, because the silicone 25 in close contact with the surface of the base 27 is soft. Incidentally, the surface shape of the base 27 corresponds to the surface shape of the interior trim part 1, because the multiple fine protrusions 3 corresponding to the particles 17 are evenly formed on the surface of the interior trim part 1.

Subsequently, the base mold 27 is dipped in an electroforming tank 31 accommodating molten nickel 29 to stack a nickel layer 33 on the surface of the base mold 27, as shown in FIG. 7(a). The base mold 27 is taken out of the electroforming tank 31 when the thickness of the nickel layer 33 becomes about 15 mm. Then, an electroforming mold 33A formed of the nickel layer 33 is completed by separating the nickel layer 33 from the base mold 27, as shown in FIG. 7(b).

The surface of the electroforming mold 33A, that has been in contact with the base mold 27, thus includes multiple recesses 33Aa corresponding to the protrusions 3 of the interior trim part 1 as the final product.

The product such as the interior trim part 1 is manufactured using the completed electroforming mold 33A. The manufacturing employs the powder slush molding method, as shown in FIG. 8 and FIG. 9. Specifically, first of all, as shown in FIG. 8(a), pipes 35 are set on the surface of the electroforming mold 33A obtained in FIG. 7(b). As shown in FIG. 8(b), a powder box 39 accommodating resin 37, such as the PVC or the TPO in a powder form, is set on a lower portion of the electroforming mold 33A.

In the state shown in FIG. 8(b), a heated liquid is flown through the pipes 35 to heat the electroforming mold 33A at about 200° C. Then, the electroforming mold 33A is turned together with the powder box 39, as shown in FIG. 8(c). The turning melts part of the resin 37 in contact with the electroforming mold 33A, and the part of the resin 37 thus adheres to the surface of the electroforming mold 33A. The attached part of the resin 37 is formed as a skin 37A on the surface of the electroforming mold 33A, as shown in FIG. 9(a).

Next, cool water for example is flown through the pipes 35 with the powder box 39 separated from the electroforming mold 33A as shown in FIG. 9(b) to cool the electroforming mold 33A. After the cooling, the skin 37A is taken out as the interior trim part 1 from the electroforming mold 33A as shown in FIG. 9(c).

Although the foregoing descriptions have been provided for the embodiment of the present invention, the embodiment is merely an example described for the purpose of facilitating an understanding of the present invention, and the present invention is not limited thereto. The technical scope of the present invention is not limited to the specific technical matters disclosed in the embodiment, and includes various modifications, changes, and alternative techniques which could be readily derived therefrom. For example, the present invention can be applied to any article, as long as the article includes a portion to be in contact with the human skin. The embodiment has been described by taking the interior trim part 1 of an automobile as an example of the article to which the present invention is applied. However, the article is not limited to the interior trim part 1, but may be an article used in a general household and the like, for example.

The present application claims priorities based on Japanese Patent Application Publication No. 2009-241219 filed on Oct. 20, 2009, and Japanese Patent Application Publication No. 2010-161867 filed on Jul. 16, 2010, the entire contents of which are herein incorporated by reference.

INDUSTRIAL APPLICABILITY

The surface structure of an article of the present invention can give the moist texture to the surface of the product, because the multiple protrusions provided on the surface of the article are short and fine.

REFERENCE SIGNS LIST 1 interior trim part (article)
2 convex surface of interior trim part
3 protrusion formed on surface of convex surface
5 recess formed between each two neighboring protrusions
H height of protrusions
P distance between each two neighboring protrusions
W distance between each two neighboring recesses

The invention claimed is:

1. A surface structure of an article comprising, on an exposed surface, a plurality of hemispherical protrusions satisfying conditions (1), (2), and (3) given below:
   (1) a height H of the protrusions is equal to or larger than 5 μm, and equal to or smaller than 32 μm;
   (2) a ratio H/P between the height H of the protrusions and a distance P between centers of two neighboring protrusions is in a range of 1/5 to 1/2, and
   (3) a frictional coefficient between a human finger and the exposed surface is within a range of 0.55±0.15.

2. A surface structure of an article comprising, on an exposed surface, a plurality of hemispherical protrusions satisfying conditions (1), (2), and (3) given below:
   (1) a height H of the protrusions is equal to or larger than 5 μm, and equal to or smaller than 32 μm;

(2) a ratio H/W between the height H of the protrusions and a distance W between centers of two neighboring recesses formed between the protrusions is in a range of 1/5 to 1/2, and (3) a frictional coefficient between a human finger and the exposed surface is within a range of 0.55±0.15.

3. The surface structure of claim 1, wherein:
at least one of the distance P between the centers of two neighboring protrusions or a distance W between centers of two neighboring recesses formed between the protrusions is larger than the height H of the protrusions.

4. The surface structure of claim 2, wherein:
at least one of a distance P between centers of two neighboring protrusions or the distance W between the centers of two neighboring recesses is larger than the height H of the protrusions.

5. The surface structure of claim 1, wherein:
the distance P between the centers of two neighboring protrusions is equivalent to a distance W between centers of two neighboring recesses formed between the protrusions.

6. The surface structure of claim 2, wherein:
a distance P between centers of two neighboring protrusions is equivalent to the distance W between the centers of two neighboring recesses.

\* \* \* \* \*